No. 783,534.                                                           Patented February 28, 1905.

UNITED STATES PATENT OFFICE.

ALBERT L. MUNSON, OF NEW YORK, N. Y.

PROCESS OF MANUFACTURING STONE OR BRICK.

SPECIFICATION forming part of Letters Patent No. 783,534, dated February 28, 1905.

Application filed June 21, 1904. Serial No. 213,556.

*To all whom it may concern:*

Be it known that I, ALBERT L. MUNSON, a citizen of the United States, residing at New York city, in the county of New York and State of New York, have invented new and useful Improvements in Processes of Manufacturing Stone or Bricks, of which the following is a specification.

This invention relates to a process of manufacturing artificial stone and brick, and has for its object, first, the provision of a means of increasing the binding and hardening properties contained in a composite mixture of materials, and, second, in the provision of a means of preventing the effloresence on the surface of the manufactured stone due to the presence therein of soluble salts which were contained originally in the mixture of materials.

The invention is particularly applicable to that class of stone products, mainly in the commercial form of bricks, now generally known as "sand-lime" bricks and in the manufacture of which the hardening or indurating process is accomplished by a chemical reaction effected by the application of steam at a high pressure to the soft molded forms of material while contained in a closed chamber. My improved process also includes a similar treatment of what is known as "sand-cement" bricks and "sand-lime-cement" bricks, both classes of which are also indurated by steam at high pressure.

In carrying out my invention I employ, in a general way, a composition of materials substantially as follows—that is to say, as a basis for sand-lime bricks, taking twenty (20) bricks as a unit base, one hundred (100) pounds of sand and ten (10) pounds of slaked lime, and as a basis for sand-lime-cement bricks, also taking twenty (20) bricks as the unit base, one hundred (100) pounds of sand, seven (7) pounds of slaked lime, and five (5) pounds of Portland cement; but in some cases, however, these proportions may be varied according to the quality, kind, and condition of the sand, as well as that of the slaked lime, which varies in its degree of purity, as it contains more or less magnesia, &c. To the mixtures of materials as is above outlined I add as an additional hardening and binding agent an astringent medium, preferably gallotannin, otherwise known as the "tannic acid" of commerce. I do not limit my invention to the use thereof, as other astringent elements will also answer the purpose, such as quercitannic acid, otherwise known as "oak-bark tannin," or catechu tannin may be used. Of any of these astringent elements I use from one to two pounds as the quantity required for the unit of twenty (20) bricks, dissolving the same in the determined quantity of water that is to be used for moistening the combined batch of materials in order to bring the mass thereof into proper condition for molding under pressure. The same proportions of astringent elements are also used in the formula for both sand-cement and sand-lime-cement bricks.

It is obvious that any of the well-known forms of mixing-machines and presses may be used for mixing the materials and for pressing the same into any desired molded forms.

The prevention of the white effloresence that appears upon the surface of the manufactured brick and which arises from the soluble salts that the various materials may carry in their original state is very desirable. This effloresence inevitably appears whenever "sea-sand" is used. Soluble salts and sulfates may also be present in the slaked lime and also in the cement. In some cases the water used in mixing may carry the undesirable element. I have found that this action of soluble salts or sulfates can be prevented by the addition to the mixtures, as previously named, of a proportion of precipitated carbonate of barytes, which will combine with the sulfate of lime or other salts present in the mixture and when subjected to the action of steam at a high pressure will cause a chemical reaction to occur wherein is formed insoluble sulfate of barytes and insoluble carbonate of lime, thereby neutralizing and rendering harmless the causes of the white effloresence now so often appearing on the surface of stone and brick after being built into walls of buildings. The proportion of precipitated carbonate of barytes that is required for a unit base of twenty (20) bricks may vary from four to twenty ounces, according to the character of the various materials in the mixture.

In some cases the mixtures, as stated, may be air-hardened by exposure in racks until the desired degree of hardness is attained. Exposure to the action of steam at atmospheric pressure may also be used to assist the hardening process; but these are slow methods, and I prefer the first-stated method—i. e., the indurating of the molded forms in a closed chamber under a steam-pressure varying from one hundred and fifty to one hundred and seventy-five pounds pressure to the square inch.

I claim as my invention—

1. A composition of matter for the manufacture of stone or brick, consisting of sand, lime and tannic acid, substantially as herein set forth.

2. A composition of matter for the manufacture of stone or brick, consisting of sand, cement and tannic acid, substantially as herein set forth.

3. A composition of matter for the manufacture of stone or brick, consisting of sand, lime, cement and tannic acid, substantially as herein set forth.

4. A composition of matter for the manufacture of stone or brick, consisting of sand, lime and precipitated carbonate of barytes, substantially as herein set forth.

5. A composition of matter for the manufacture of stone or brick, consisting of sand, cement, and precipitated carbonate of barytes, substantially as herein set forth.

6. A composition of matter for the manufacture of stone or brick, consisting of sand, lime, cement, and precipitated carbonate of barytes, substantially as herein set forth.

7. A composition of matter for the manufacture of stone or brick, consisting of sand, lime, tannic acid and precipitated carbonate of barytes, substantially as herein set forth.

8. A composition of matter for the manufacture of stone or brick, consisting of sand, cement, tannic acid and precipitated carbonate of barytes, substantially as herein set forth.

9. A composition of matter for the manufacture of stone or brick, consisting of sand, lime, cement, tannic acid and precipitated carbonate of barytes, substantially as set forth.

10. The herein-described method of making stone or brick, which consists in the combination of determined quantities of sand, lime, tannic acid and a moistening agent; thoroughly mixing the same, molding the resulting mass under pressure and then subjecting the molded forms to the action of steam applied in a closed chamber at high pressure.

11. The herein-described method of making stone or brick, which consists in the combination of determined quantities of sand, lime, tannic acid, precipitated carbonate of barytes and a moistening agent, thoroughly mixing the same, molding the resulting mass under pressure and then subjecting the molded forms to the action of steam applied in a closed vessel at high pressure.

12. The herein-described method of making stone or brick, which consists in the combination of determined quantities of sand, lime, precipitated carbonate of barytes, and a moistening agent, thoroughly mixing the same, molding the resulting mass under pressure and then subjecting the molded forms to the action of steam applied in a closed chamber at high pressure.

13. The herein-described method of making stone or brick, which consists in the combination of determined quantities of sand, cement, tannic acid and a moistening agent, thoroughly mixing the same, molding the resulting mass under pressure and then subjecting the molded forms to the action of steam applied in a closed chamber at high pressure.

14. The herein-described method of making stone or brick, which consists in the combination of determined quantities of sand, cement, precipitated carbonate of barytes and a moistening agent, thoroughly mixing the same, molding the resulting mass under pressure and then subjecting the molded forms to the action of steam applied in a closed chamber at high pressure.

15. The herein-described method of making stone or bricks, which consists in the combination of determined quantities of sand, cement, tannic acid, precipitated carbonate of barytes and a moistening agent, thoroughly mixing the same, molding the resulting mass under pressure and then subjecting the molded forms to the action of steam at high pressure applied in a closed chamber.

16. The herein-described method of making stone or bricks, which consists in the combination of determined quantities of sand, lime, cement, tannic acid and a moistening agent, thoroughly mixing the same, molding the resulting mass under pressure and then subjecting the molded forms to the action of steam applied in a closed chamber at high pressure.

17. The herein-described method of making stone or brick, which consists in the combination of determined quantities of sand, lime, cement, precipitated carbonate of barytes and a moistening agent, thoroughly mixing the same, molding the resulting mass under pressure and then subjecting the molded forms to the action of steam applied in a closed chamber at high pressure.

18. The herein-described method of making stone or bricks, which consists in the combination of determined quantities of sand, lime, cement, tannic acid, precipitated carbonate of barytes and a moistening agent, thoroughly mixing the same, molding the resulting mass under pressure and then subjecting the molded forms to the action of steam applied thereto in a closed chamber at high pressure.

In testimony whereof I have signed my name to this specification in the presence of the two subscribing witnesses.

ALBERT L. MUNSON.

Witnesses:
  Chas. F. Williams,
  Edw. B. Munson.